United States Patent
Wang

(10) Patent No.: US 9,502,915 B2
(45) Date of Patent: Nov. 22, 2016

(54) CHARGING AND DISCHARGING APPARATUS AND TERMINAL

(71) Applicant: HUAWEI DEVICE CO., LTD., Shenzhen (CN)

(72) Inventor: Lifei Wang, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 279 days.

(21) Appl. No.: 14/134,444

(22) Filed: Dec. 19, 2013

(65) Prior Publication Data

US 2014/0103879 A1    Apr. 17, 2014

Related U.S. Application Data

(63) Continuation of application No. PCT/CN2013/078284, filed on Jun. 28, 2013.

(30) Foreign Application Priority Data

Jun. 29, 2012   (CN) .................... 2012 2 0313466 U

(51) Int. Cl.
   *H02J 7/00*     (2006.01)
(52) U.S. Cl.
   CPC ............ *H02J 7/0068* (2013.01); *H02J 7/0054* (2013.01)
(58) Field of Classification Search
   CPC .................................................. H02J 7/0068
   USPC ....................................................... 320/128
   See application file for complete search history.

(56) References Cited

U.S. PATENT DOCUMENTS 3,696,283 A * 10/1972 Ackley, III ........... H02J 7/0003
                                                       320/101
4,739,242 A *  4/1988 McCarty ............... H02J 7/0013
                                                       30/DIG. 1

(Continued)

FOREIGN PATENT DOCUMENTS

| CN | 101499669 A | 8/2009 |
| CN | 201839051 U | 5/2011 |
| TW | M421641 U1  | 1/2012 |

OTHER PUBLICATIONS

Extended European Search report issued on Jul. 24, 2014 in corresponding European Patent Application No. 13 789 694.0.

(Continued)

*Primary Examiner* — Drew A Dunn
*Assistant Examiner* — Jerry D Robbins
(74) *Attorney, Agent, or Firm* — Staas & Halsey LLP

(57) ABSTRACT

Embodiments provide a charging and discharging apparatus and a terminal. The charging and discharging apparatus includes a charging and discharging interface and a interface wire; the charging and discharging interface includes a charging and discharging circuit; the charging and discharging circuit includes a battery connection end, a current input end, and a current output end; one end of the interface wire for external connection is electrically connected to the battery connection end, and the other end is connected to a battery of a first terminal; the current input end is configured to be connected to a current output end; the second charging and discharging apparatus is electrically connected to a second terminal; the current output end is configured to be connected to a current input end. Embodiments are used to realize mutual charging between terminals.

9 Claims, 8 Drawing Sheets

(56) References Cited

U.S. PATENT DOCUMENTS

| | | | | |
|---|---|---|---|---|
| 6,204,632 | B1* | 3/2001 | Nierescher | H02J 7/0013 320/106 |
| 6,612,875 | B1* | 9/2003 | Liao | H01R 13/2421 439/638 |
| 7,480,138 | B2* | 1/2009 | Kogan | B60R 11/0241 361/679.02 |
| 8,346,979 | B1* | 1/2013 | Lee | G06F 1/1632 235/449 |
| 2003/0050102 | A1* | 3/2003 | Roh | H02J 7/0031 455/573 |
| 2003/0135681 | A1* | 7/2003 | Laity | G06F 13/385 710/303 |
| 2004/0057199 | A1* | 3/2004 | Azuchi | G06F 1/1626 361/679.3 |
| 2004/0189251 | A1* | 9/2004 | Kutkut | H02J 7/022 320/128 |
| 2008/0119241 | A1 | 5/2008 | Dorogusker et al. | |
| 2009/0023480 | A1 | 1/2009 | Nandi et al. | |
| 2009/0133733 | A1* | 5/2009 | Retti | H01M 10/465 136/206 |
| 2009/0134836 | A1* | 5/2009 | Zhao | H02J 7/0054 320/103 |
| 2011/0316472 | A1* | 12/2011 | Han | G06F 13/4068 320/103 |
| 2013/0038288 | A1* | 2/2013 | Yeh | H02J 7/0027 320/114 |
| 2013/0093240 | A1* | 4/2013 | Lin | H02J 7/0042 307/11 |

OTHER PUBLICATIONS

International Search Report issued Oct. 17, 2013, in corresponding International Patent Application No. PCT/CN2013/078284.

* cited by examiner

CHARGING AND DISCHARGING APPARATUS AND TERMINAL

CROSS-REFERENCE TO RELATED APPLICATIONS

This application is a continuation of International Application No. PCT/CN2013/078284, filed on Jun. 28, 2013, which claims priority to Chinese Patent Application No. 201220313466.3, filed on Jun. 29, 2012, both of which are hereby incorporated by reference in their entireties.

FIELD

The present embodiments relate to the field of electronic devices, and in particular, to a charging and discharging apparatus and a terminal.

BACKGROUND

With the continuous improvement of a mobile phone performance, power consumption of the mobile phone also increases proportionally. The battery of a large-screen touch mobile phone usually lasts less than one day, and consequently an important phone call or schedule may easily be missed. As a result, under the circumstances of the original battery capacity of the mobile phone and no standby battery, to solve the problem of running out of the battery of the mobile phone, at present, there appears in the industry some solutions of a replaceable dry battery, such as a digital mate, and an external power source, such as on-the-go terminal-sharing battery wiring.

However, these technologies need additional parts and need changes in an original appearance of the mobile phone. In particular, for the on-the-go terminal-sharing battery wiring, a charging circuit design needs to be integrated on a terminal side and discharging or charging needs to be adjusted by changing the terminal design. This brings inconvenience to a user in using, thereby affecting user experience.

SUMMARY

Embodiments of the present invention provide a charging and discharging apparatus and a terminal to implement mutual charging, thereby improving user experience.

To achieve the above, embodiments of the present invention use the following technical solutions:

A charging and discharging apparatus is provided, including:
  including a charging and discharging interface and an interface wire for external connection, where the charging and discharging interface includes an interface shell and a charging and discharging circuit disposed inside the interface shell, where
  the charging and discharging circuit includes a battery connection end, a current input end, and a current output end; where one end of the interface wire for external connection is electrically connected to the battery connection end, and the other end is electrically connected to a battery of a first terminal; the current input end is configured to be connected to a current output end of a second charging and discharging apparatus to charge the battery of the first battery; the second charging and discharging apparatus is electrically connected to a second terminal; and the current output end is configured to be connected to a current input end of the second charging and discharging apparatus to output electric energy in the battery of the first battery.

The interface shell includes at least one pin and at least one socket, where
  the pin is configured to package the current output end of the charging and discharging circuit, and the socket is configured to package the current input end of the charging and discharging circuit; and
  that the current input end is configured to be connected to the current output end of the second charging and discharging apparatus includes:
  the socket of the charging and discharging apparatus configured to be connected to a pin of the second charging and discharging apparatus; and
  that the current output end is configured to be connected to the current input end of the second charging and discharging apparatus includes:
  the pin of the charging and discharging apparatus configured to be inserted into a socket of the second charging and discharging apparatus.

The interface shell further includes a connector;
  the connector is configured to package the battery connection end of the charging and discharging circuit; and
  that one end of the interface wire for external connection is electrically connected to the battery connection end includes:
  one end of the interface wire for external connection being electrically connected to the battery connection end through the connector.

The pin and the socket of the charging and discharging interface match each other.

The pin is a convex pin, and the socket is a concave socket.

A shape of the convex pin matches a shape of the concave socket.

The interface shell includes two bottom faces and at least three side faces, and the connector, the pin, and the socket are provided on the side faces separately.

A terminal is provided, including:
  a terminal body, a battery, and a charging and discharging apparatus, where the charging and discharging apparatus is a charging and discharging apparatus according to claims 1 to 6;
  the battery is disposed inside the terminal body, and configured to electrically connect a battery connection end of a charging and discharging circuit in the charging and discharging apparatus through an interface wire for external connection in the charging and discharging apparatus.

The charging and discharging apparatus and the terminal provided in embodiments of the present invention include the charging and discharging interface and the interface wire for external connection in the charging and discharging apparatus, where the charging and discharging interface includes a battery connection end, a current input end, and a current output end; one end of the interface wire for external connection is electrically connected to the battery connection end, and the other end is electrically connected to a battery of a first terminal; the current input end is configured to be connected to a current output end of a second charging and discharging apparatus, so as to charge the battery of the first battery; the second charging and discharging apparatus is electrically connected to a second terminal; the current output end is configured to be connected to a current input end of the second charging and discharging apparatus, so as to output electric energy in the battery of the first battery. For the on-the-go terminal-sharing battery wiring in the prior art, the technical solutions of the present invention, under the circumstances that no additional part and no change in a terminal design are needed for adjusting discharging and charging, implement mutual charging, thereby improving user experience.

BRIEF DESCRIPTION OF THE DRAWINGS

To describe the technical solutions in the embodiments of the present invention or in the prior art more clearly, the following briefly introduces the accompanying drawings for describing the embodiments. Apparently, the accompanying drawings in the following description show merely some embodiments of the present invention, and persons of ordinary skill in the art may still derive other drawings from the accompanying drawings without creative efforts.

DETAILED DESCRIPTION OF THE EMBODIMENTS

The following clearly describes the technical solutions of the present invention with reference to the accompanying drawings. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1A:
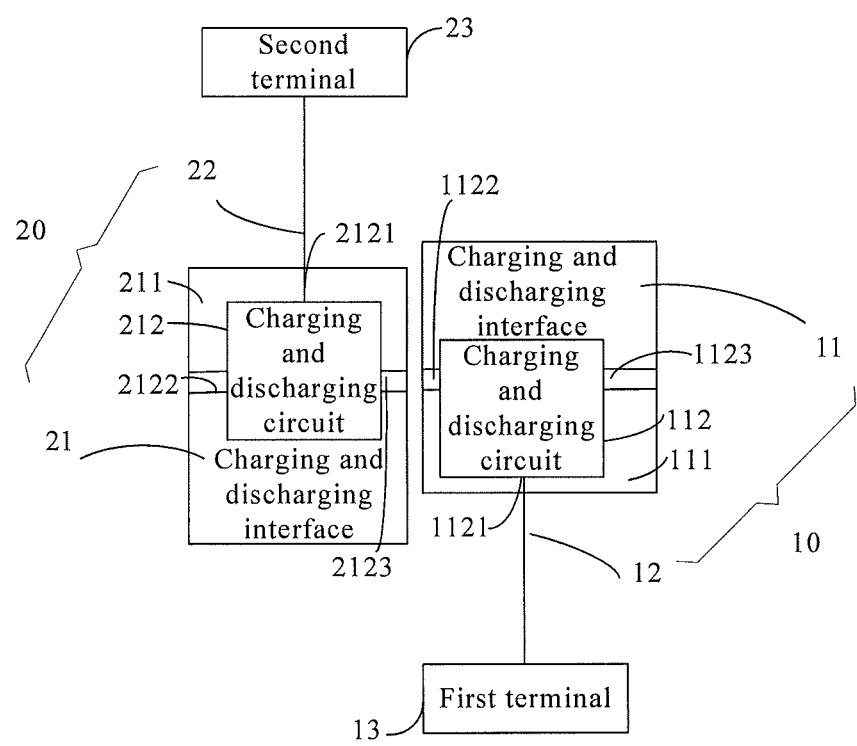
FIG. 1A is a schematic diagram of a charging and discharging apparatus according to an embodiment of the present invention.
Figure 1B:
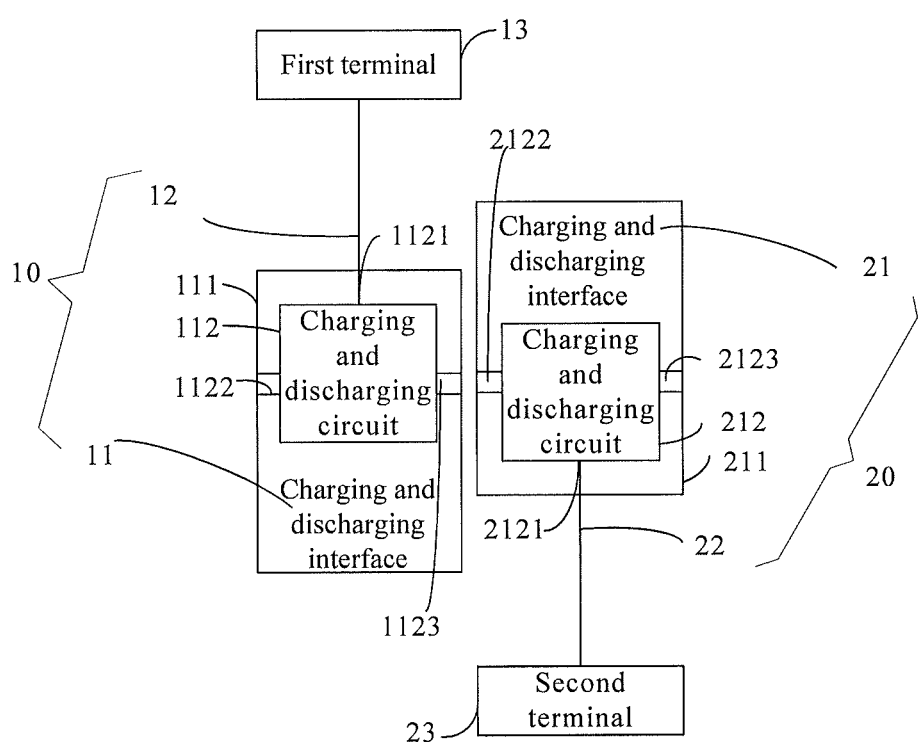
FIG. 1B is another schematic diagram of a charging and discharging apparatus according to an embodiment of the present invention.

As shown in FIG. 1A, a charging and discharging apparatus 10 according to an embodiment of the present invention includes a charging and discharging interface 11 and a interface wire 12 for external connection, where the charging and discharging interface includes an interface shell 111 and a charging and discharging circuit 112 provided in the interface shell 111; the charging and discharging circuit 112 includes a battery connection end 1121, a current input end 1122, and a current output end 1123; one end of the interface wire 12 for external connection is electrically connected to the battery connection end 1121, and the other end is electrically connected to a battery of a first terminal 13; the current input end 1122 is configured to be connected to a current output end 2123 of a second charging and discharging apparatus 20, so as to charge the first terminal 13 battery; the second charging and discharging apparatus 20 is electrically connected to a second terminal 23. As shown in FIG. 1B, the current output end 1123 is configured to be connected to a current input end 2122 of the second charging and discharging apparatus 20, so as to output electric energy in the first terminal 13.

Figure 2:
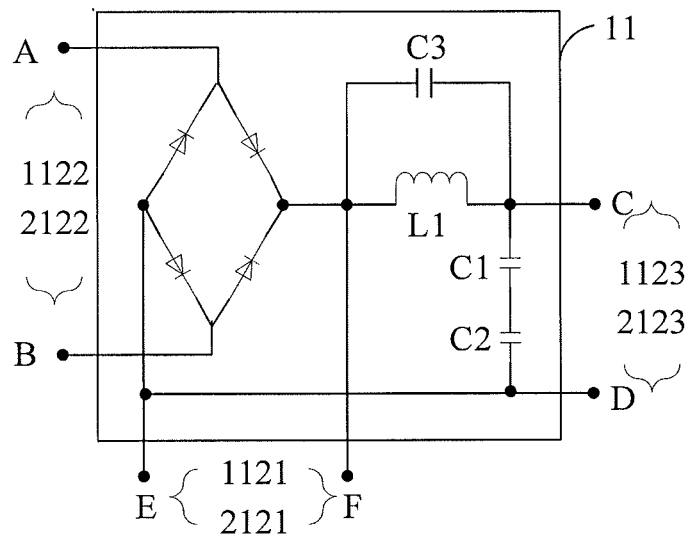
FIG. 2 is another schematic diagram of a charging and discharging apparatus according to an embodiment of the present invention.

Preferably, in the charging and discharging apparatus 10 according to the embodiment of the present invention, the charging and discharging circuit 112 thereof is specifically shown in FIG. 2. An existing charging and discharging circuit may be used to implement electric energy conversion and transmission, where ends A and B are current input ends, ends C and D are current output ends, and ends E and F are battery connection ends.

It should be noted that the displayed charging and discharging circuit may be in other circuit forms as long as electric energy conversion and transmission is implemented. The present invention sets no specific limitation thereto.

Figure 3A:
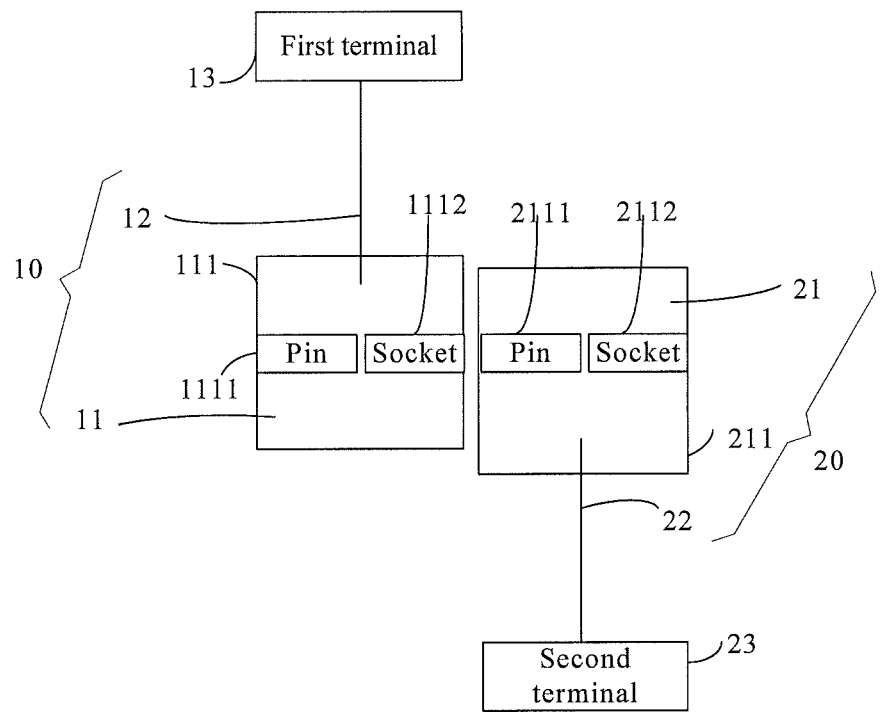
FIG. 3A is another schematic diagram of a charging and discharging apparatus according to an embodiment of the present invention.
Figure 3B:
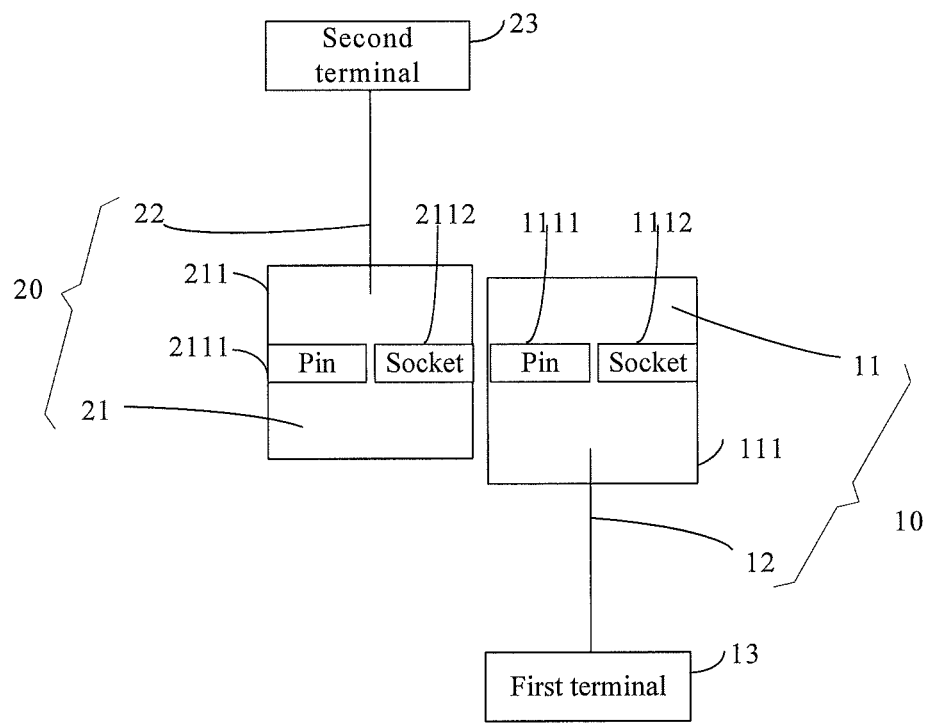
FIG. 3B is another schematic diagram of a charging and discharging apparatus according to an embodiment of the present invention.

Referring to FIG. 3A or FIG. 3B, in this embodiment, the interface shell 111 includes at least one pin 1111 and at least one socket 1112, where the pin 1111 is configured to package the current output end 1123 of the charging and discharging circuit 112; the socket 1112 is configured to package the current input end 1122 of the charging and discharging circuit 112; that the current input end 1122 is configured to be connected to the current output end 2123 of the second charging and discharging apparatus 20 includes: the socket 1112 of the charging and discharging apparatus 10 configured to be connected to a pin 2111 of the second charging and discharging apparatus 20; and that the current output end 1123 is configured to be connected to the current input end 2122 of the second charging and discharging apparatus 20 includes: the pin 1111 of the charging and discharging apparatus 10 is configured to be inserted into a socket 2112 of the second charging and discharging apparatus 20.

It should be noted that the interface shell shown in FIG. 3A or FIG. 3B is configured to package the charging and discharging circuit disposed inside the interface shell shown in FIG. 2.

Figure 4:
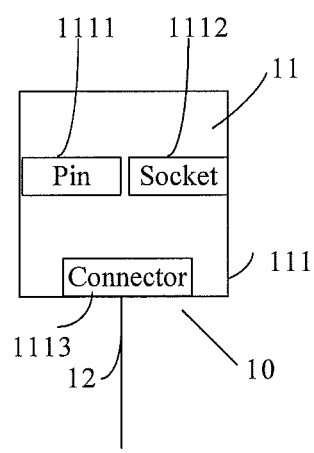
FIG. 4 is another schematic diagram of a charging and discharging apparatus according to an embodiment of the present invention.

Further, referring to FIG. 4, in this embodiment, the interface shell 111 further includes a connector 1113, where the connector 1113 is configured to package the battery connection end 1121 of the charging and discharging apparatus 10; and that one end of the interface wire 12 for external connection is electrically connected to the battery connection end 1121 includes: the one end of the interface wire 12 for external connection being electrically connected to the battery connection end 1121 through the connector 1113.

Further, a shape of the interface shell 111 of the charging and discharging interface 11 of the charging and discharging apparatus 10 includes a pentahedron, a hexahedron, and the like. It should be noted that the shape of the interface shell 111 of the charging and discharging interface 11 of the charging and discharging apparatus 10 may also be other regular shapes or irregular polyhedron, polygon, spherical shape, and the like. The invention sets no limitation thereto.

Preferably, the interface shell 111 includes two bottom faces and at least three side faces, and the connector 1113, the pin 1111, and the socket 1112 are disposed on the side faces separately.

Further, the pin 1111 and the socket 1112 of the charging and discharging interface 11 match each other.

It should be noted that when the shape of the interface shell 111 of the charging and discharging interface 11 of the charging and discharging apparatus 10 that is electrically connected to the first terminal 13 is different from a shape of an interface shell 211 of a charging and discharging interface 21 of the charging and discharging apparatus 20 that is electrically connected to the second terminal 23, it is allowed as long as it is ensured that the pin 1111 on the interface shell 111 of the charging and discharging interface 11 of the charging and discharging apparatus 10 that is electrically connected to the first terminal 13 matches the socket 2112 on the charging and discharging apparatus 20 that is connected to the second terminal 23, or the socket 1112 on the charging and discharging apparatus 10 that is electrically connected to the first terminal 13 matches the pin 2111 on the charging and discharging apparatus 20 that is connected to the second terminal 23. The present invention sets no limitation to specific shapes thereof.

Figure 5:
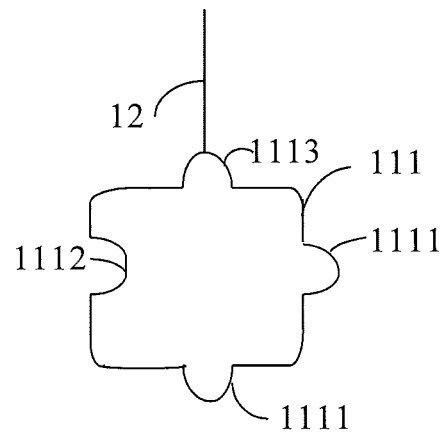
FIG. 5 is another schematic diagram of a charging and discharging apparatus according to an embodiment of the present invention.

Further, as shown in FIG. 5, the pin 1111 is a convex pin; the socket 1112 is a concave socket; and a shape of the convex pin 1111 matches a shape of the concave socket 1112.

It should be noted that the same charging and discharging apparatuses may be electrically to the first terminal 13 and the second terminal 23 to realize mutual charging between the first terminal and the second terminal. Specifically: when the first terminal 13 charges the second terminal 23, the pin of the charging and discharging apparatus connected to the first terminal 13 is inserted into the socket of the charging and discharging apparatus connected to the second terminal 23. Because the charging and discharging apparatuses connected to the two terminals are the same, when it is necessary for the second terminal 23 to charge the first terminal 13, only a connection manner of the two charging and discharging apparatuses needs to be changed, that is, the pin of the charging and discharging apparatus connected to the second terminal 23 is inserted into the socket of the charging and discharging apparatus connected to the first terminal 13, and it is unnecessary to replace the charging and discharging apparatuses connected to the two terminals.

In addition, the shape of the pin 1111 further includes a semi-circle shape, square wave shape, triangle shape, and the like; and the shape of the socket 1112 is a concave semi-circle shape, square wave shape, triangle shape, and the like that may be connected to or match the shape of the pin 1111.

It should be noted that the shapes of the pin 1111 and the socket 1112 may be other figures. The invention sets no limitation thereto either.

Figure 6A:
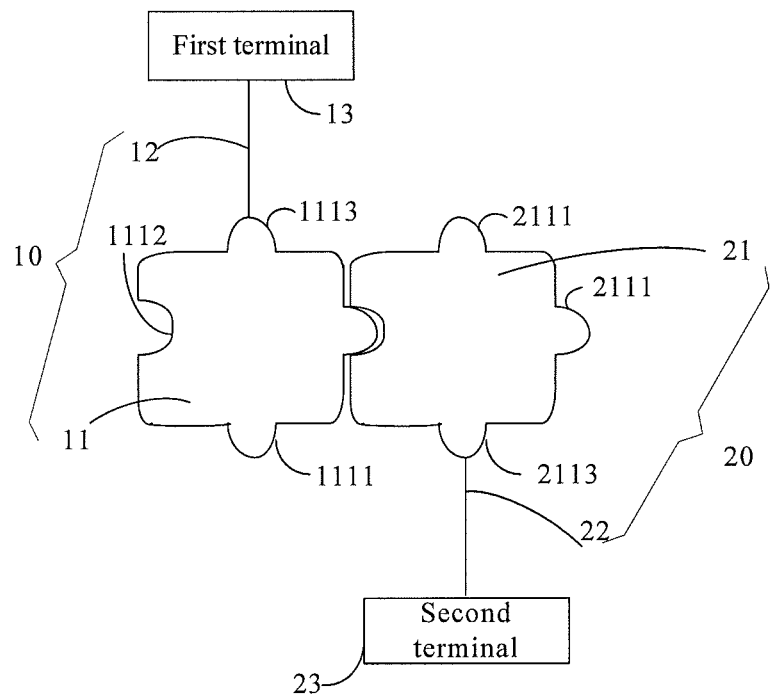
FIG. 6A is another schematic diagram of a charging and discharging apparatus according to an embodiment of the present invention.

Referring to FIG. 6A, for example, the pin is a convex pin 1111; the socket is a concave socket 1112; the interface shell 111 includes two pins 1111; and the convex pins 1111 of the charging and discharging apparatus 10 electrically connected to the first terminal 13 are inserted into concave sockets 2112 of the charging and discharging apparatus 20 electrically connected to the second terminal 23.

Figure 6B:
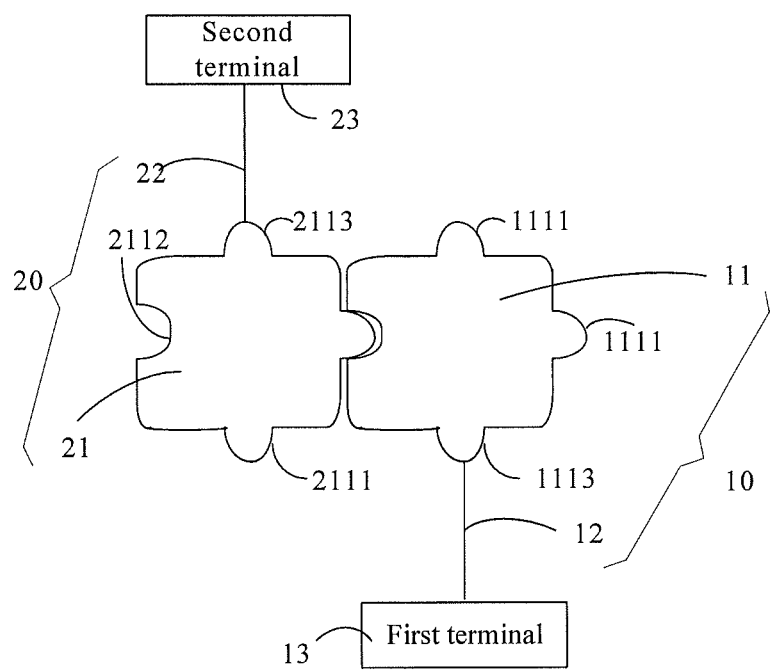
FIG. 6B is another schematic diagram of a charging and discharging apparatus according to an embodiment of the present invention.

Referring to FIG. 6B, for example, the pin is a convex pin 1111; the socket is a concave socket 1112; the interface shell 111 includes two pins 1111; and convex pins 2111 of the charging and discharging apparatus 20 electrically connected to the second terminal 23 are connected to the concave sockets 1112 of the charging and discharging apparatus 10 electrically connected to the first terminal 13.

It should be noted that the connection mode shown in FIG. 6A implements a process of charging the second terminal 23 by the first terminal 13, and the connection manner shown in FIG. 6B implements a process of charging the first terminal 13 by the second terminal 23. That is, different interface insertion and connection manners are used to implement a process of providing charging for the second terminal 23 by the first terminal 13 or a process of providing charging for the first terminal 13 by the second terminal 23.

Figure 7:
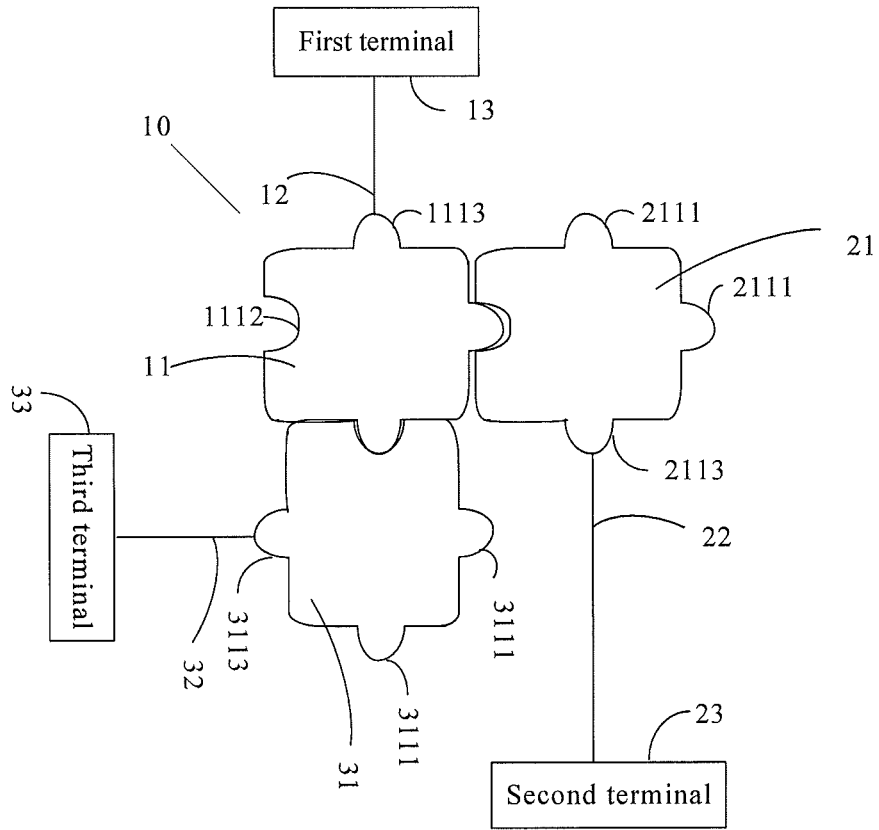
FIG. 7 is another schematic diagram of a charging and discharging apparatus according to an embodiment of the present invention.

In addition, as shown in FIG. 7, the charging and discharging apparatus 10 connected to the first terminal 13 may charge the second terminal 23 and a third terminal 33 simultaneously, thereby realizing one-to-many charging. If the charging and discharging apparatus 10 has three or four pins, the charging and discharging apparatus 10 may be used to implement charging for three or four devices at the same time. It should be noted that the charging and discharging apparatus 10 may have a plurality of pins 1111. In such cases, considering the appearance and practicability of the charging and discharging apparatus, the number of pins 1111 may be set in combination with the shape of the charging and discharging apparatus 10. The embodiment of the invention sets no specific limitation to the number of pins 1111.

Figure 8:
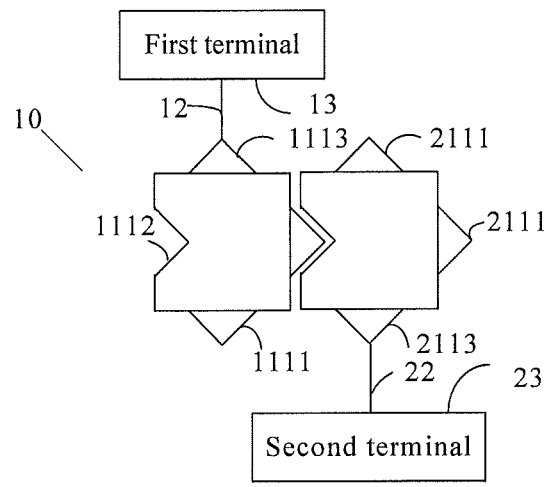
FIG. 8 is another schematic diagram of a charging and discharging apparatus according to an embodiment of the present invention.

For example, as shown in FIG. 8, the shape of the interface shell of the charging and discharging interface of the charging and discharging apparatus 10 is a rectangle, the pin 1111 is a triangle and the socket 1112 is a concave triangle matching the pin 1111. If the shape of the interface shell 111 of the charging and discharging apparatus 10 is a rectangle, the interface shell 111 of the charging and discharging interface 11 of the charging and discharging apparatus 10 may include two pins 1111, one socket 1112, and one connector 1113, which are disposed on 4 side faces of the rectangle interface shell separately.

Figure 9:
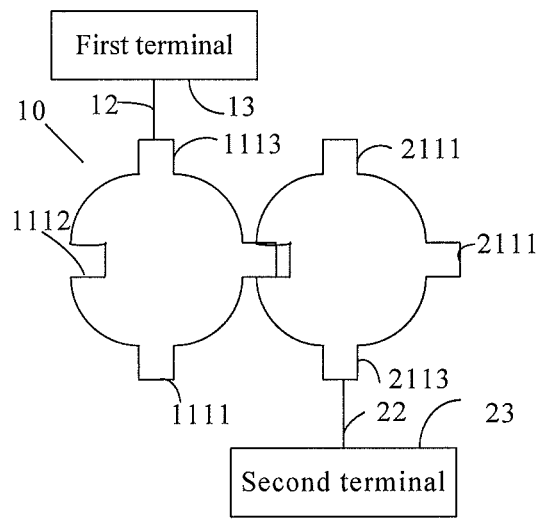
FIG. 9 is another schematic diagram of a charging and discharging apparatus according to an embodiment of the present invention.

For example, as shown in FIG. 9, the interface shell 111 of the charging and discharging apparatus 11 of the charging and discharging apparatus 10 is a circle, the pin 1111 is a rectangle and the socket 1112 is a concave rectangle matching the pin 1111. If the interface shell 111 of the charging and discharging interface 11 of the charging and discharging apparatus 10 is a circle, it may include two pins 1111, one socket 1112, and one connector 1113, which are evenly disposed on a side face of the circle interface shell.

In addition, there may be one, two, or more pins 1111. It should be noted that the number of pins 1111 and the shape and design of the interface shell 111 of the charging and discharging interface 11 of the charging and discharging apparatus 10 are related to user requirements. The present invention sets no limitation to the number of pins 1111.

In an actual application, it may be assumed that the first terminal 13 and the second terminal 23 are mobile phones; and the interface wire 12 for external connection may electrically connect the charging and discharging apparatus 10 to a battery of the mobile phone through an interface for hanging decoration designed originally on the mobile phone, thereby realizing a charging process.

In addition, it may also be assumed that the first terminal 13 and the second terminal 23 are personal digital assistants PDA or tablet computers, and the like. The invention sets no limitation thereto.

The charging and discharging apparatus provided in embodiments of the present invention includes the charging and discharging interface and the interface wire for external connection in the charging and discharging apparatus, where the charging and discharging interface includes a battery connection end, a current input end, and a current output end; one end of the interface wire for external connection is electrically connected to the battery connection end, and the other end is electrically connected to a battery of a first terminal; the current input end is configured to be connected to a current output end of a second charging and discharging apparatus, so as to charge the battery of the first battery; the second charging and discharging apparatus is electrically connected to a second terminal; the current output end is configured to be connected to a current input end of the second charging and discharging apparatus, so as to output electric energy in the battery of the first battery. For the on-the-go terminal-sharing battery wiring in the prior art, the technical solutions of the present invention realize mutual charging under the circumstances that no additional part and no change in a terminal design are needed for adjusting discharging and charging, thereby improving user experience.

Figure 10:
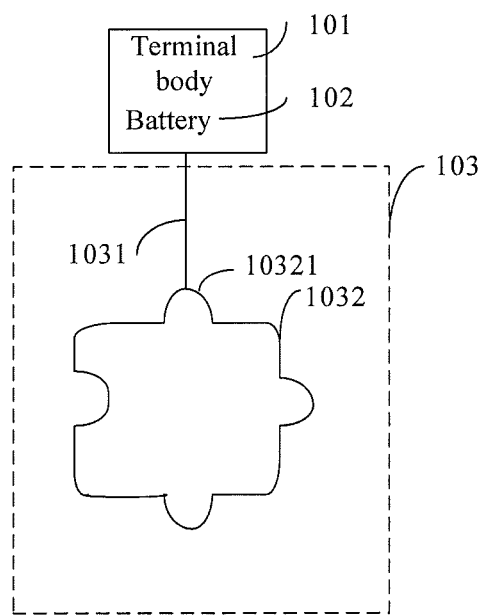
FIG. 10 is a schematic diagram of a terminal according to an embodiment of the present invention.

As shown in FIG. 10, the present invention provides a terminal 100, including a terminal body 101, a battery 102, and a charging and discharging apparatus 103, where the charging and discharging apparatus 103 is the charging and discharging apparatus shown in any one of FIG. 1 to FIG. 9; the battery 102 is disposed inside the terminal body 101, and configured to electrically connect a battery connection end 10321 of a charging and discharging circuit 1032 in the charging and discharging apparatus through an interface wire for external connection 1031 in the charging and discharging apparatus 103.

It should be noted that, charging and discharging processes between the first terminal and the second terminal may be the specific charging and discharging processes described in the above charging and discharging apparatus, which are not described repeatedly in this embodiment.

The terminal provided in embodiments of the present invention includes the charging and discharging interface and the interface wire for external connection in the charging and discharging apparatus, where the charging and discharging interface includes a battery connection end, a current input end, and a current output end; one end of the interface wire for external connection is electrically connected to the battery connection end, and the other end is electrically connected to a battery of a first terminal; the current input end is configured to be connected to a current output end of a second charging and discharging apparatus, so as to charge the battery of the first battery; the second charging and discharging apparatus is electrically connected to a second terminal; the current output end is configured to be connected to a current input end of the second charging and discharging apparatus, so as to output electric energy in the battery of the first battery. For the on-the-go terminal-sharing battery wiring in the prior art, the technical solutions of the present invention realize mutual charging under the circumstances that no additional part and no change in a terminal design are needed for adjusting discharging and charging, thereby improving user experience.

The foregoing descriptions are merely exemplary embodiments of the present invention, but are not intended to limit the protection scope of the present invention. Any variation, equivalent replacement, or improvement made by persons skilled in the art within the disclosed technical scope of the present invention should fall within the protection scope of the present invention. Therefore, the protection scope of the present invention shall be subject to the protection scope claimed by the claims.

What is claimed is:

1. A charging and discharging apparatus, comprising;
a charging and discharging interface; and
an interface wire for external connection;
wherein:
   the charging and discharging interface comprises an interface shell and a charging and discharging circuit disposed inside the interface shell,
   the charging and discharging circuit comprises a battery connection end, a current input end, and a current output end,
   first end of the interface wire for external connection is electrically connectable to the battery connection end, and a second end is electrically connectable to a battery of a first terminal,
   the current input end is connectable to a current output end of a second charging and discharging apparatus, the second charging and discharging apparatus having a same type of interface shell and a same type of charging and discharging circuit as the charging and discharging apparatus,
   the second charging and discharging apparatus is electrically connectable to a second terminal,
   the current output end of the charging and discharging apparatus is configured to be connected to a current input end of the second charging and discharging apparatus to output electric energy in the battery of the first terminal, and
   the charging and discharging circuit is configured to control a current flow between the first terminal and the second terminal so that:
      the battery of the first terminal charges while a battery of the second terminal discharges when:
         the current input end of the charging and discharging apparatus is connected to the current output end of the second charging and discharging apparatus,
         the first terminal is electrically connected via the interface wire to the charging and discharging apparatus, and
         the second terminal is electrically connected to the second charging and discharging apparatus, and
      the battery of the first terminal discharges while a battery of the second terminal charges when:
         the current output end of the charging and discharging apparatus is connected to the current input end of the second charging and discharging apparatus,
         the first terminal is electrically connected via the interface wire to the charging and discharging apparatus, and
         the second terminal is electrically connected to the second charging and discharging apparatus.

2. The apparatus according to claim 1, wherein:
the interface shell comprises at least one pin and at least one socket,
the pin is configured to package the current output end of the charging and discharging circuit,
the socket is configured to package the current input end of the charging and discharging circuit, the socket of the charging and discharging apparatus configured to be connected to a pin of the second charging and discharging apparatus, and the pin of the charging and discharging apparatus configured to be inserted into a socket of the second charging and discharging apparatus.

3. The apparatus according to claim 2, wherein:

the interface shell further comprises a connector, the connector is configured to package the battery connection end of the charging and discharging circuit, and the first end of the interface wire connects to the battery connection end through the connector.

4. The apparatus according to claim 2, wherein the pin and the socket of the charging and discharging interface match each other.

5. The apparatus according to claim 2, wherein:

the pin is a convex pin, the socket is a concave socket, and a shape of the convex pin matches a shape of the concave socket.

6. The apparatus according to claim 2, wherein the interface shell comprises two bottom faces and at least three side faces, and the connector, the pin, and the socket are disposed on the side faces separately.

7. A terminal, comprising;

a terminal body, a battery;

and a charging and discharging apparatus, wherein:

the charging and discharging apparatus comprises a charging and discharging interface and an interface wire for external connection, the charging and discharging interface comprises an interface shell and a charging and discharging circuit disposed inside the interface shell, the charging and discharging circuit comprises a battery connection end, a current input end, and a current output end, a first end of the interface wire is electrically connectable to the battery connection end, and a second end of the interface wire is electrically connectable to the battery, the current input end is connectable to a current output end of a second charging and discharging apparatus, the second charging and discharging apparatus having a same type of interface shell and a same type of charging and discharging circuit as the charging and discharging apparatus, the current output end is connectable to a current input end of the second charging and discharging apparatus to output electric energy in the battery, the battery is disposed inside the terminal body, and configured to be electrically connected to a battery connection end of the charging and discharging circuit in the charging and discharging apparatus through the interface wire, and the charging and discharging circuit is configured to control a current flow between the battery and the second terminal so that:

the battery charges while the second terminal discharges when:

the current input end of the charging and discharging apparatus is connected to the current output end of the second charging and discharging apparatus, the battery is electrically connected via the interface wire to the charging and discharging apparatus, and the second terminal is electrically connected to the second charging and discharging apparatus, and the battery discharges while the second terminal charges when:

the current output end of the charging and discharging apparatus is connected to the current input end of the second charging and discharging apparatus, the battery is electrically connected via the interface wire to the charging and discharging apparatus, and the second terminal is electrically connected to the second charging and discharging apparatus.

8. The apparatus according to claim 1, wherein the charging and discharging circuit of both the charging and discharging apparatus and the second charging and discharging apparatus comprises:

a rectifier circuit connected to the current input end and the battery connection end; and an LC filter circuit connected to the battery connection end, the rectifier circuit, and the current output end.

9. The apparatus according to claim 1, wherein when the current output end of the charging and discharging apparatus is connected to a power input end of a third charging and discharging apparatus and a third terminal is electrically connected to the third charging and discharging apparatus:

the second terminal discharges, the first terminal charges, and the third terminal charges.

* * * * *